(12) United States Patent
Owaki

(10) Patent No.: US 11,152,726 B2
(45) Date of Patent: Oct. 19, 2021

(54) CONNECTOR DEVICE AND CONNECTOR SYSTEM

(71) Applicant: SONY SEMICONDUCTOR SOLUTIONS CORPORATION, Kanagawa (JP)

(72) Inventor: Hirofumi Owaki, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/617,815

(22) PCT Filed: May 23, 2018

(86) PCT No.: PCT/JP2018/019754
§ 371 (c)(1),
(2) Date: Nov. 27, 2019

(87) PCT Pub. No.: WO2018/225503
PCT Pub. Date: Dec. 13, 2018

(65) Prior Publication Data
US 2020/0119474 A1    Apr. 16, 2020

(30) Foreign Application Priority Data
Jun. 6, 2017   (JP) .............................. JP2017-111618

(51) Int. Cl.
*H01R 12/71* (2011.01)
*H04N 5/225* (2006.01)

(52) U.S. Cl.
CPC ........... *H01R 12/716* (2013.01); *H04N 5/225* (2013.01)

(58) Field of Classification Search
CPC .............................. H01R 12/716; H04N 5/225
(Continued)

(56) References Cited

U.S. PATENT DOCUMENTS 5,055,060 A * 10/1991 Down ................. H01R 13/6397
                                                                439/304
5,179,877 A *  1/1993 Down ................. H01R 13/6397
                                                                 81/442
5,658,158 A *  8/1997 Milan .................. H01R 13/514
                                                                439/214
(Continued)

FOREIGN PATENT DOCUMENTS

JP          06-005153 U      1/1994
JP          10-312866 A     11/1998
(Continued)

OTHER PUBLICATIONS

International Search Report and Written Opinion of PCT Application No. PCT/JP2018/019754, dated Aug. 7, 2018, 08 pages of ISRWO.

*Primary Examiner* — Alexander Gilman
(74) *Attorney, Agent, or Firm* — Chip Law Group

(57) ABSTRACT

The present technology relates to a connector device and a connector system capable of achieving reduction in manufacturing cost. Provided is a connector device including a first contact used in actual use, and a second contact used only in manufacturing, in which the first contact and the second contact have different core lengths in a case of being viewed from a connection target side. The present technology can be applied to a camera device electrically connected to a vehicle connector, for example.

21 Claims, 16 Drawing Sheets

(58) Field of Classification Search
USPC .......................................................... 439/34
See application file for complete search history.

(56) References Cited

U.S. PATENT DOCUMENTS

| | | | | |
|---|---|---|---|---|
| 6,056,590 | A * | 5/2000 | Takahashi ............ | H01R 13/641 |
| | | | | 439/188 |
| 6,783,392 | B1 * | 8/2004 | Torii .................... | H01R 12/707 |
| | | | | 439/404 |
| 7,029,330 | B1 * | 4/2006 | Ro ....................... | H01R 13/443 |
| | | | | 439/148 |
| 7,901,215 | B1 * | 3/2011 | Galgoci ............... | B60Q 1/0088 |
| | | | | 439/34 |
| 9,853,400 | B1 * | 12/2017 | Brodsky .............. | H01H 71/462 |
| 9,986,136 | B2 * | 5/2018 | Newiger ............... | G02B 7/028 |
| 10,313,572 | B2 * | 6/2019 | Wohlte .................. | B60R 11/04 |
| 10,506,141 | B2 * | 12/2019 | Sigle ................. | H04N 5/22521 |
| 2001/0031565 | A1 * | 10/2001 | Sakiyama ................. | H01T 1/06 |
| | | | | 439/38 |
| 2008/0084530 | A1 * | 4/2008 | Hirabayashi ........... | H05K 1/118 |
| | | | | 349/150 |
| 2014/0187089 | A1 * | 7/2014 | Buck ................... | H01R 13/719 |
| | | | | 439/620.01 |
| 2014/0194001 | A1 * | 7/2014 | Iwasawa ............ | H01R 13/5219 |
| | | | | 439/587 |
| 2016/0268716 | A1 * | 9/2016 | Conger ................... | H04N 7/18 |

FOREIGN PATENT DOCUMENTS

| | | |
|---|---|---|
| JP | 2002-101568 A | 4/2002 |
| JP | 2011-176757 A | 9/2011 |
| JP | 2014-203734 A | 10/2014 |

* cited by examiner

CONNECTOR DEVICE AND CONNECTOR SYSTEM

CROSS REFERENCE TO RELATED APPLICATIONS

This application is a U.S. National Phase of International Patent Application No. PCT/JP2018/019754 filed on May 23, 2018, which claims priority benefit of Japanese Patent Application No. JP 2017-111618 filed in the Japan Patent Office on Jun. 6, 2017. Each of the above-referenced applications is hereby incorporated herein by reference in its entirety.

TECHNICAL FIELD

The present technology relates to a connector device and a connector system, and more particularly to a connector device and a connector system capable of achieving reduction in manufacturing cost.

BACKGROUND ART

In recent years, vehicles equipped with cameras have been increasing. For example, an image captured by an in-car camera can be shown to a driver or other passengers on a monitor screen in the vehicle interior, or can be recorded on a drive recorder.

Additionally, image processing such as image recognition is applied to the image captured by the in-car camera to detect white lines (lanes) on a road, traffic lights, road signs, oncoming vehicles, and pedestrians around the vehicle, for example, and driving support and visual field support can be performed on the basis of the detection result.

For example, the in-car camera is attached to the front, rear, or side of the vehicle through a dedicated connector as a front view camera, a rear view camera, or a side view camera. By using a dedicated connector, the in-car camera can be easily attached at the time of manufacturing. Patent Document 1 discloses a known technology related to a connector, for example.

CITATION LIST

Patent Document

Patent Document 1: Japanese Patent Application Laid-Open No. 2014-203734

SUMMARY OF THE INVENTION

Problems to be Solved by the Invention

Incidentally, a connector used for an in-car camera is often required to be strictly restricted in size for convenience of routing in a vehicle. Additionally, it is necessary to write parameter information to an in-car camera through contacts (communication cores) at the time of manufacturing. Hence, at the time of actual use (at the time of product use), an in-car camera has surplus contacts that were used only at the time of manufacturing.

In a connector, such presence of unnecessary contacts at the time of actual use leads to an increase in manufacturing cost.

The present technology has been made in view of such a situation, and is intended to achieve reduction in manufacturing cost in a connector device such as an in-car camera provided with a connector.

Solutions to Problems

A connector device of one aspect of the present technology is a connector device including a first contact used in actual use, and a second contact used only in manufacturing, in which the first contact and the second contact have different core lengths in a case of being viewed from a connection target side.

In the connector device of one aspect of the present technology, the first contact used in actual use and the second contact used only in manufacturing have different core lengths in a case of being viewed from a connection target side.

A connector system of one aspect of the present technology is a connector system including a first connector device and a second connector device, in which: the first connector device includes a first contact used in actual use, and a second contact used only in manufacturing; the first contact and the second contact have different core lengths in a case of being viewed from a connection target side; and the second connector device includes a connection portion corresponding to the first contact.

In the connector system of one aspect of the present technology, in the first connector device, the first contact used in actual use and the second contact used only in manufacturing have different core lengths in a case of being viewed from a connection target side, and the second connector device is provided with a connection portion corresponding to the first contact.

Effects of the Invention

According to one aspect of the present technology, reduction in manufacturing cost can be achieved.

Note that the effect described herein is not necessarily limited, and may be any effect described in the present disclosure.

MODE FOR CARRYING OUT THE INVENTION

Hereinafter, embodiments of the present technology will be described with reference to the drawings. Note that the description will be given in the following order.

1. Outline of present technology

2. Structure of connector portion to which present technology is applied

3. Structure of connector portion at time of connection

4. Modification

5. Example of application to mobile object

1. Outline of Present Technology

Figure 1:
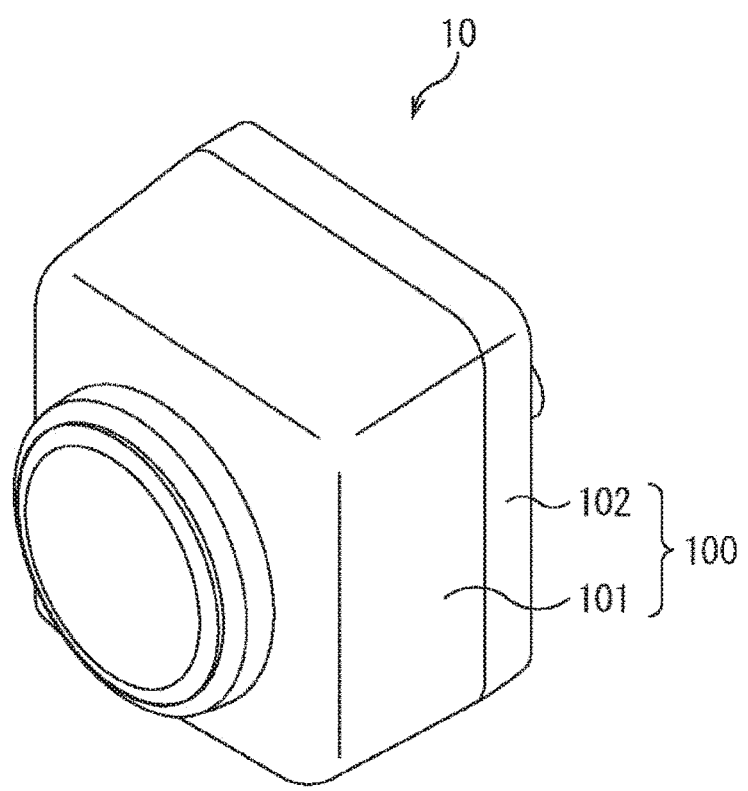
FIG. 1 is a perspective view showing the structure of a camera device.
Figure 2:
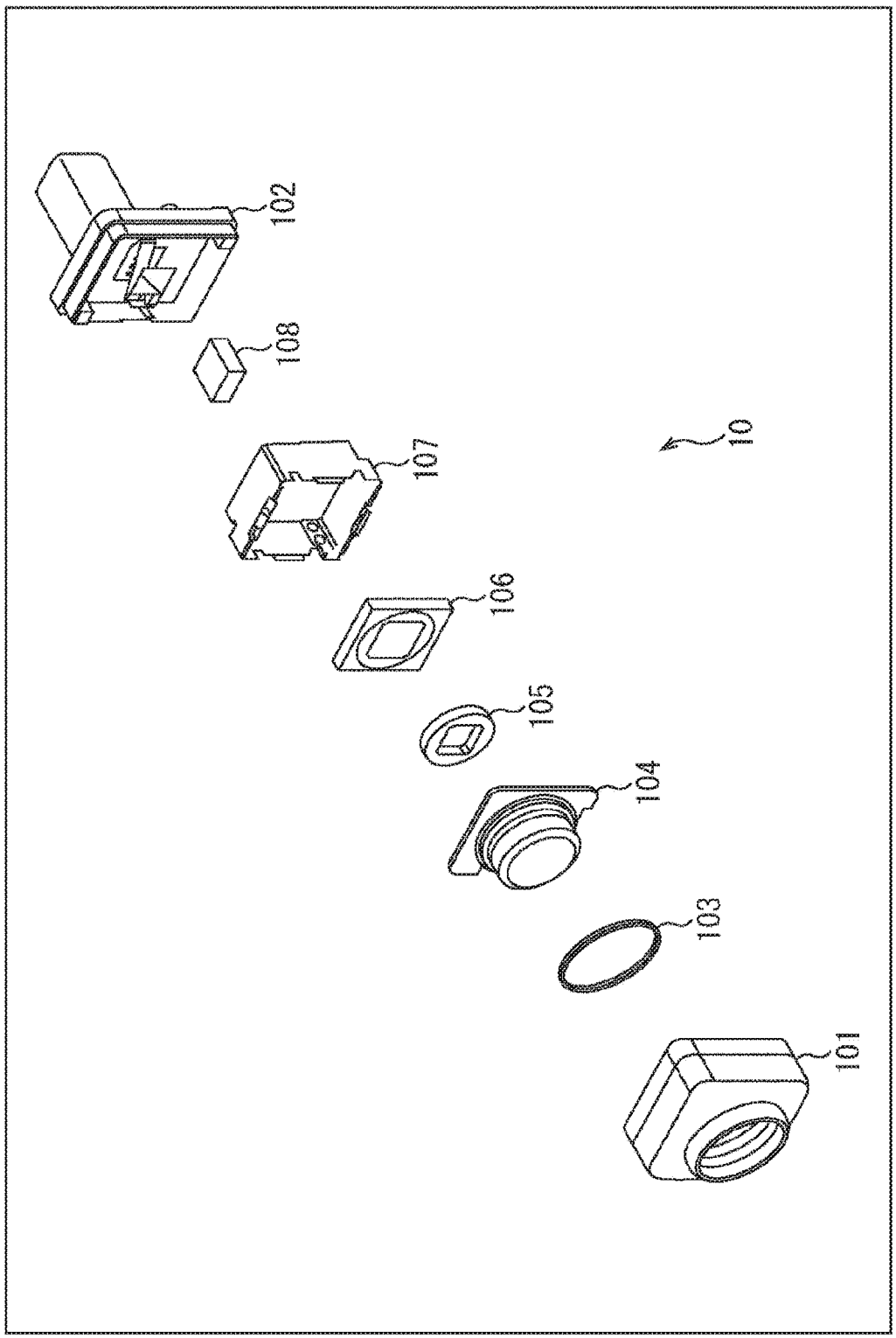
FIG. 2 is an exploded perspective view of the camera device as viewed from the front side.

FIG. 1 is a perspective view showing a camera device 10. Additionally, FIG. 2 shows an exploded perspective view of the camera device 10 as viewed from the front side. Hereinafter, a configuration of the camera device 10 will be described with reference to FIG. 1 and FIG. 2.

The camera device 10 is mounted on a vehicle and forms an in-car camera system. For example, the camera device 10 is attached to the front, rear, or side of the vehicle through a dedicated connector as a front view camera, a rear view camera, or a side view camera.

Here, the front view camera is provided in the vicinity of a front grille of the vehicle, for example, and captures an image of an area in front of the vehicle which is a blind spot for the driver. Additionally, the front view camera captures an image to be used for an upper area to display a video (around view monitor (AVM)) which appears like looking down from above the vehicle.

The rear view camera is attached near a tail gate of the vehicle, for example. Examples of a specific attachment position include the side of a handle portion of the tail gate and the vicinity of a license plate. The rear view camera captures an image of an area behind the vehicle which is a blind spot for the driver, and also captures an image to be used for a lower area to display the around view monitor (AVM).

The side view camera is disposed in a housing of a side mirror or in the vicinity of the side mirror, for example. The side view camera captures images of areas on the right and left of the vehicle which are blind spots for the driver, and also captures images to be used for the right and left areas to display the around view monitor (AVM).

While a captured image captured by the camera device 10 is basically used for the purpose of displaying an image in the vehicle interior, the captured image may also be used for other purposes such as object recognition (sensing) of peripheral vehicles, pedestrians, roads (lanes), road signs, and the like, and recording to a drive recorder.

Here, as shown in FIG. 2, the camera device 10 includes a lens barrel 104 incorporating an imaging lens fitted in a housing 100 including a front case 101 and a rear case 102, and an imaging mechanism 106 that has an imaging device for taking in light incident through the imaging lens. Note that an O-ring 103 for sealing is attached to the lens barrel 104. Additionally, a dustproof sheet 105 is provided between the lens barrel 104 and the imaging mechanism 106.

Moreover, a shield chassis 107 that blocks unnecessary electromagnetic waves generated inside and outside the camera device 10 is provided in the housing 100. The shield chassis 107 is larger than the area of a substrate of the imaging mechanism 106 but is slightly smaller than the housing 100, and is disposed along an inner surface of the rear case 102 to cover the periphery of the substrate. Additionally, the shield chassis 107 is open at the front and the back.

With this configuration, the substrate of the imaging mechanism 106 and a flexible printed circuit (FPC) in the rear case 102 are electrically connected through the opening on the back side of the shield chassis 107. Additionally, since the flexible printed circuit is also connected to a connector portion on the rear case 102 side, the substrate of the imaging mechanism 106 and the connector portion of the rear case 102 are electrically connected. Note that the substrate of the imaging mechanism 106 is fixed by a spacer 108.

Figure 3:
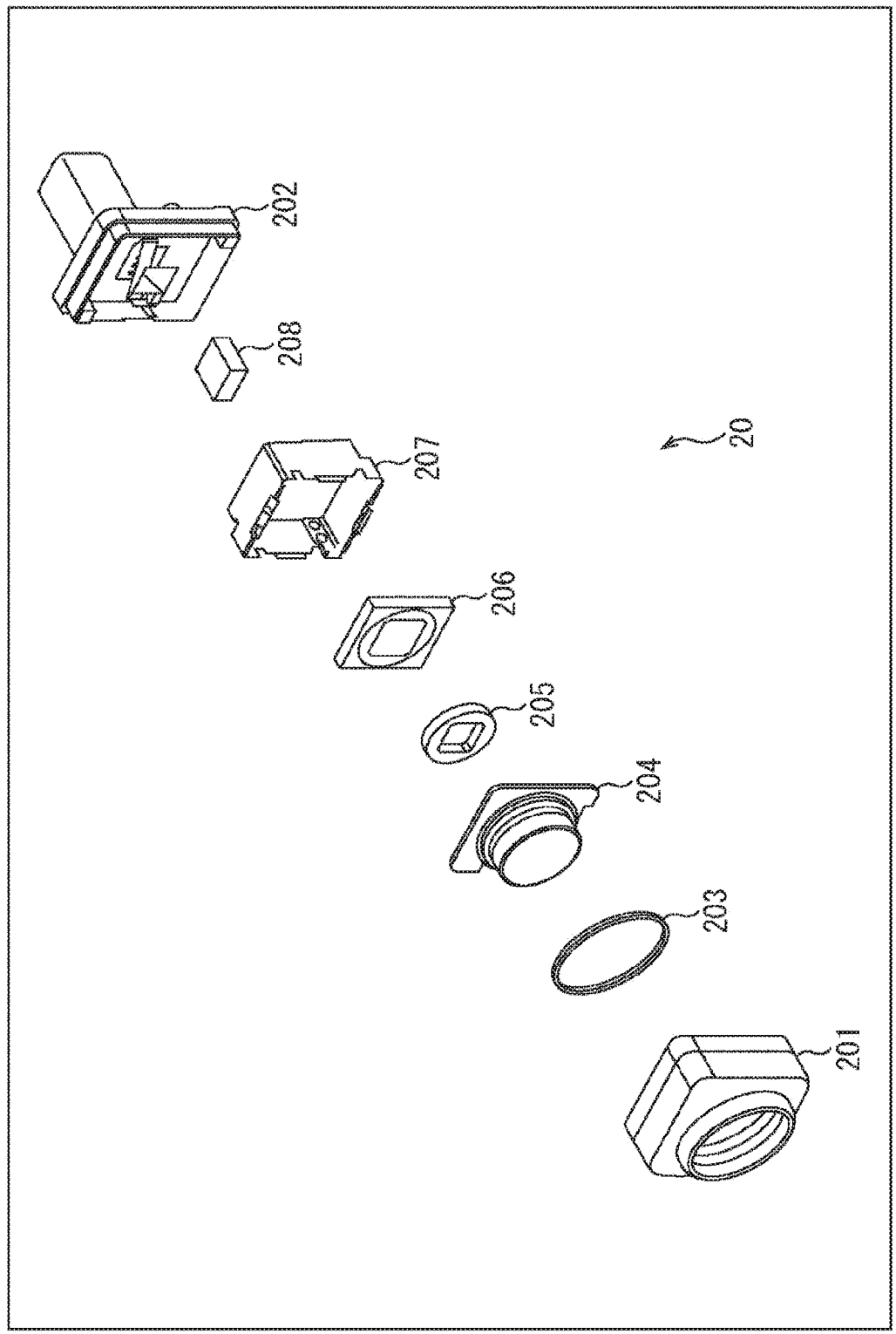
FIG. 3 is an exploded perspective view of the camera device as viewed from the front side.

Note that FIG. 3 shows an exploded perspective view of a camera device 20 as viewed from the front side, similar to the case of FIG. 2. Although the camera device 20 is different in type from the camera device 10, a front case 201 to a spacer 208 in FIG. 3 is basically configured in a manner similar to the front case 101 to the spacer 108 in FIG. 2. In the following description, the camera device 10 will be described.

Incidentally, a connector used for an in-car camera is often required to be strictly restricted in size for convenience of routing in a vehicle. Meanwhile, it is necessary to write parameter information to an in-car camera through contacts (communication cores) at the time of manufacturing. Hence, at the time of actual use (at the time of product use), an in-car camera has surplus contacts that were used only at the time of manufacturing.

In a connector, such presence of unnecessary contacts at the time of actual use leads to an increase in manufacturing cost. Additionally, the presence of unnecessary contacts at the time of actual use also causes an increase in size.

Hence, in the technology according to the present disclosure (present technology), the core lengths of the contacts used in actual use and the contacts used only in manufacturing are made different. A dedicated jig connector is used in manufacturing, and parameter information is written through contacts used only in manufacturing. As a result, the number of contacts (cores) used in actual use can be reduced. This can achieve reduction in manufacturing cost due to the reduction in the number of cores and downsizing of the connector itself.

Note that in the following description, contacts used in actual use will be referred to as "actual use contacts", and contacts used only in manufacturing will be referred to as "manufacturing contacts" for distinction.

2. Structure of Connector Portion to which Present Technology is Applied (Structure of Connector Portion)

Next, the structure of a connector portion 121 provided in the rear case 102 will be described with reference to FIGS. 4 to 8.

Figure 4:
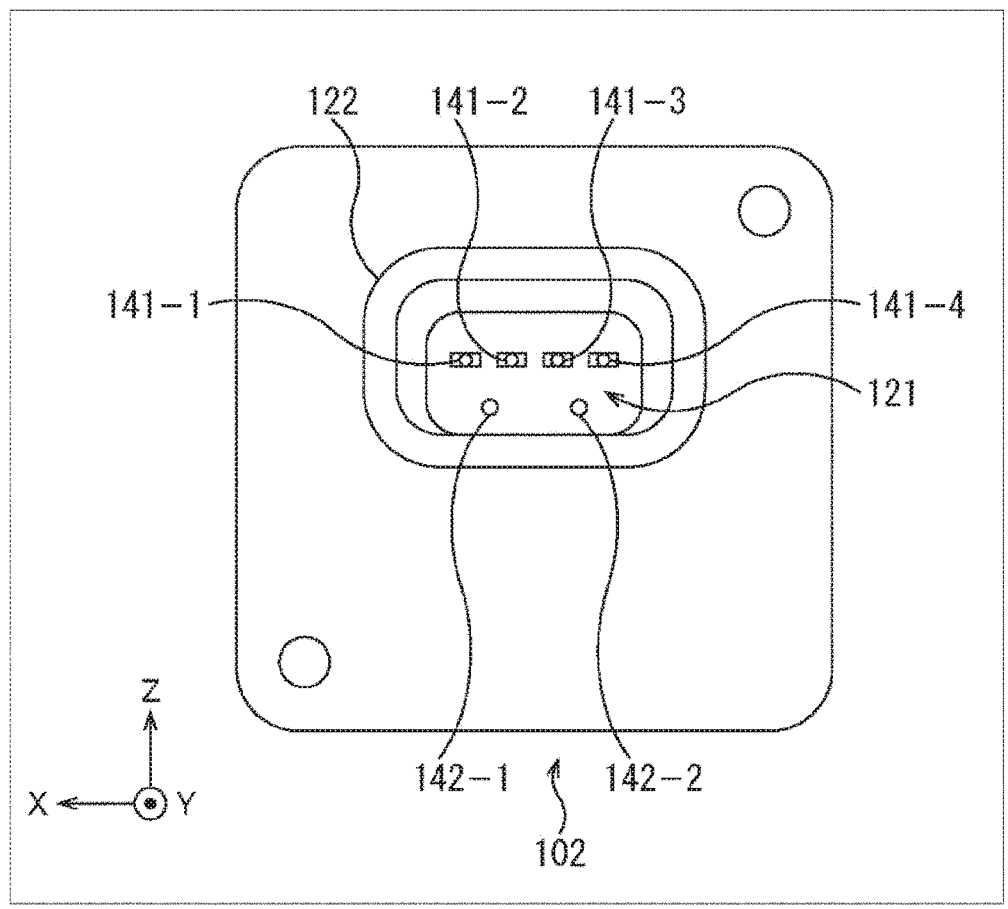
FIG. 4 is a front view showing the structure of a connector portion of a rear case.

FIG. 4 is a front view showing the connector portion 121 of the rear case 102. In FIG. 4, the connector portion 121 is disposed in the rear case 102 on the side (connection target side) to be connected to a vehicle connector (vehicle connector 30 in FIG. 10 described later) provided on the vehicle side. The connector portion 121 is provided with four actual use contacts 141-1 to 141-4 and two manufacturing contacts 142-1 and 142-2.

That is, in the connector portion 121, the four actual use contacts 141-1 to 141-4 are provided in positions corresponding to a connector portion on the vehicle connector side (e.g., connector having recessed shape corresponding to protrusion of core of actual use contacts 141-1 to 141-4) when the connector portion 121 and the vehicle connector are connected at the time of actual use.

With this configuration, at the time of actual use, the actual use contacts 141-1 to 141-4 provided in the connector portion 121 of the camera device 10 are fitted to the connector portion on the vehicle connector side to be electrically connected, and various signals are exchanged.

Additionally, in the connector portion 121, the two manufacturing contacts 142-1 and 142-2 are provided in positions corresponding to terminals disposed on a jig connector (not shown) side when the connector portion 121 and the jig connector are connected at the time of manufacturing.

Here, the jig connector is a dedicated connector for writing various types of parameter information to the camera device 10 through the manufacturing contacts 142-1 and 142-2 provided in the connector portion 121 at the time of manufacturing. The jig connector is electrically connected to a device used at the time of manufacturing.

Note that the manufacturing contacts 142-1 and 142-2 come into contact with the terminals of the jig connector to be electrically connected, and the device used at the time of manufacturing can write parameter information to the camera device 10.

With this configuration, at the time of manufacturing, the manufacturing contacts 142-1 and 142-2 of the connector portion 121 of the camera device 10 are connected to the terminals of the jig connector to be electrically connected, and parameter information is written to a nonvolatile memory incorporated in the camera device 10.

Note that parameter information includes information required to capture an image or the like, for example. Additionally, details of the jig connector will be described later.

Figure 5:
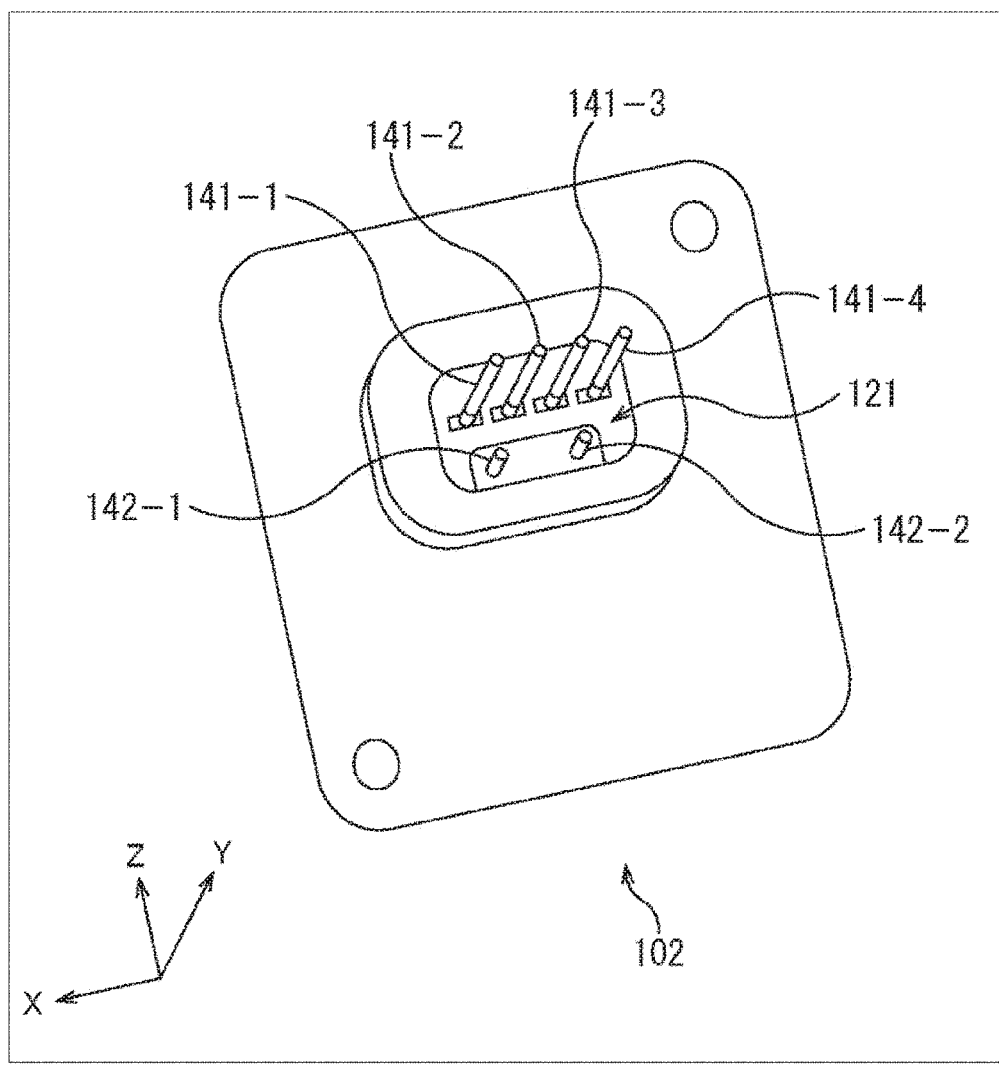
FIG. 5 is a perspective view showing the structure of the connector portion when a square tube-shaped member is removed.

Additionally, in the rear case 102, a square tube-shaped member 122 formed to follow the shape of the vehicle connector is provided around the connector portion 121. FIG. 5 shows a perspective view of the connector portion 121 when the square tube-shaped member 122 is removed.

In FIG. 5, among the contacts provided in the connector portion 121, the four actual use contacts 141-1 to 141-4 have the same core length, and the two manufacturing contacts 142-1 and 142-2 have the same core length.

That is, the actual use contacts 141-1 to 141-4 have a longer core length than the manufacturing contacts 142-1 and 142-2, and the core length differs between the actual use contact and the manufacturing contact. Additionally, the shape of the actual use contacts 141-1 to 141-4 is different from the shape of the manufacturing contacts 142-1 and 142-2.

In the connector portion 121, the two manufacturing contacts 142-1 and 142-2 are disposed at a predetermined interval in an area excluding the area where the four actual use contacts 141-1 to 141-4 are disposed (area on −Z side in FIG. 5).

That is, the manufacturing contacts 142-1 and 142-2 are arranged next to each other at a predetermined interval in the horizontal direction, which is the same direction as the four actual use contacts 141-1 to 141-4 arranged next to one another in the horizontal direction in a case of being viewed from the side of the vehicle connector to be connected.

As described above, in the connector portion 121, since the layout of the actual use contacts 141-1 to 141-4 is determined by the shape of the connector portion on the vehicle connector side, the area excluding the area where the actual use contacts 141-1 to 141-4 are arranged (remaining area) is used as the area for arranging the manufacturing contacts 142-1 and 142-2.

Note that in the case where the manufacturing contacts 142-1 and 142-2 are arranged in the remaining area, they can be arranged in arbitrary positions in consideration of the strength or the like of (the core of) the contacts, for example.

Here, for example, the distance between the actual use contact 141 and the manufacturing contact 142 can be designed in consideration of the material used when processing the connector portion 121 (e.g., in consideration of flowability of potting material for waterproofing). Additionally, ease of making contacts disposed in the connector portion 121 or the like may be taken into consideration, for example.

Figure 6:
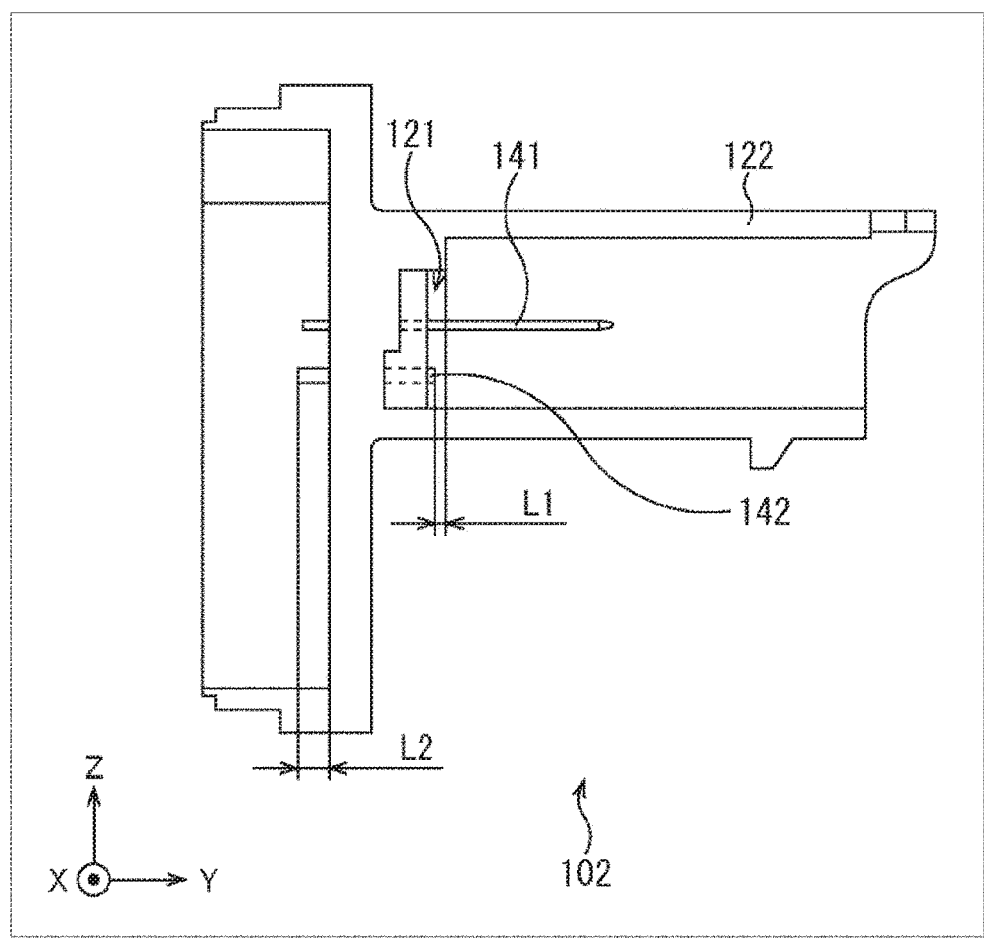
FIG. 6 is a cross-sectional view showing the structure of the connector portion of the rear case.

Here, FIG. 6 shows a cross-sectional view of the connector portion 121 of the rear case 102. In FIG. 6, the vehicle connector is inserted into and fitted to the square tube-shaped member 122 of the rear case 102, whereby the connector portions of both parts are electrically connected. At this time, while the actual use contacts 141-1 to 141-4 are electrically connected to the connector portion on the vehicle connector side, the manufacturing contacts 142-1 and 142-2 are not electrically connected to the connector portion on the vehicle connector side.

Specifically, as shown in FIG. 6, in a case where the member 122 of the rear case 102 and the vehicle connector are fitted and the connector portion of both parts are electrically connected, the tip ends of the cores of the manufacturing contacts 142-1 and 142-2 are separated from a tip end surface of the vehicle connector by a length L1. That is, at the time of actual use, the tip ends of the cores of the manufacturing contacts 142-1 and 142-2 do not come into contact with the tip end surface of the vehicle connector.

Note that in the rear case 102, the manufacturing contacts 142-1 and 142-2 also protrude through to the side (rear surface side of connector portion 121) of the connection surface to be connected to the flexible substrate. Here, the length of the protruding core of the manufacturing contacts 142-1 and 142-2 are a length L2, which can be different from the length L1.

Note, however, that L2>L1 may be true. Additionally, although the length L1 is affected by the shape of the vehicle connector and other factors, the length L1 should preferably be as long as possible to prevent the manufacturing contact 142 from getting in the way during actual use. For example, L1=0.5 mm and L2=1.2 mm can be used.

Figure 7:
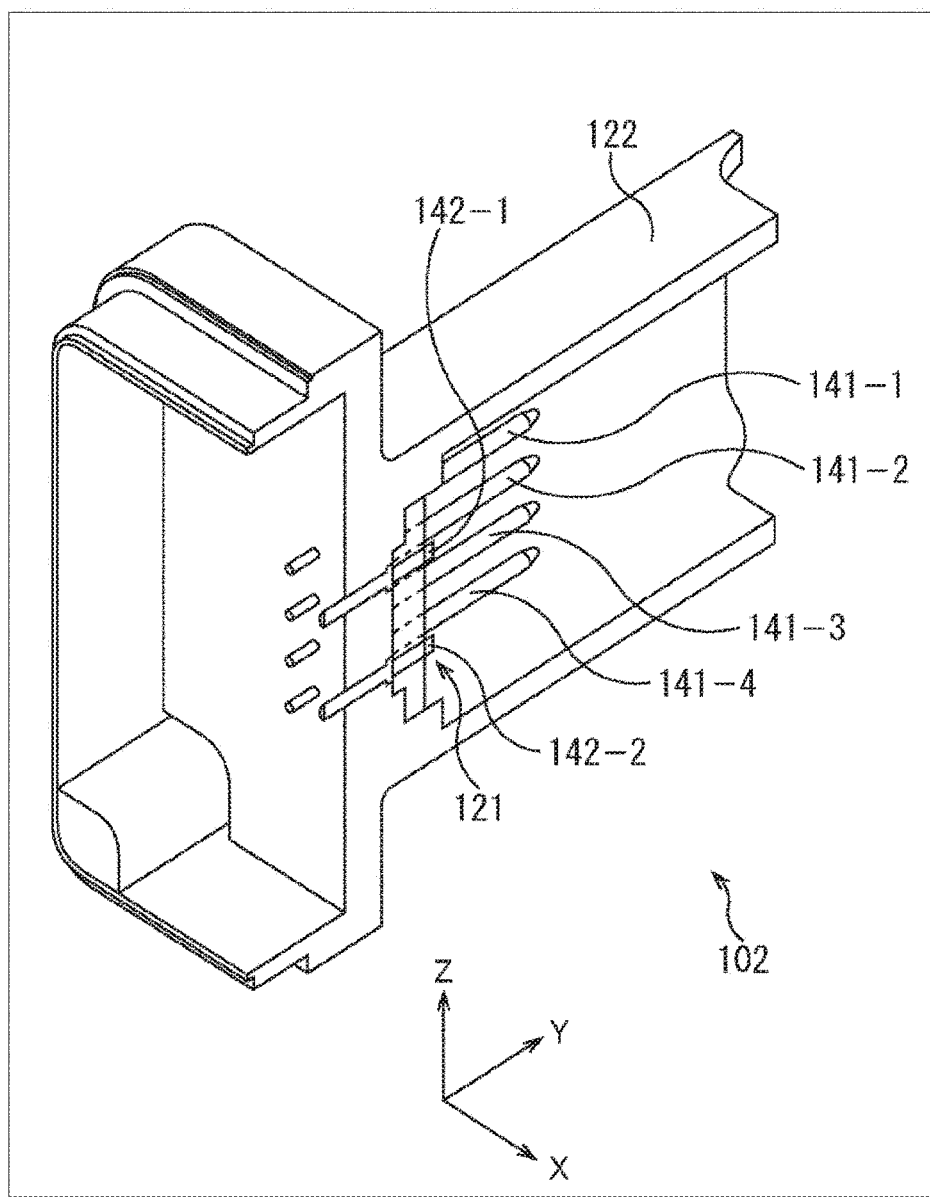
FIG. 7 is a cross-sectional view including a cross-sectional structure of a manufacturing contact disposed in the connector portion.
Figure 8:
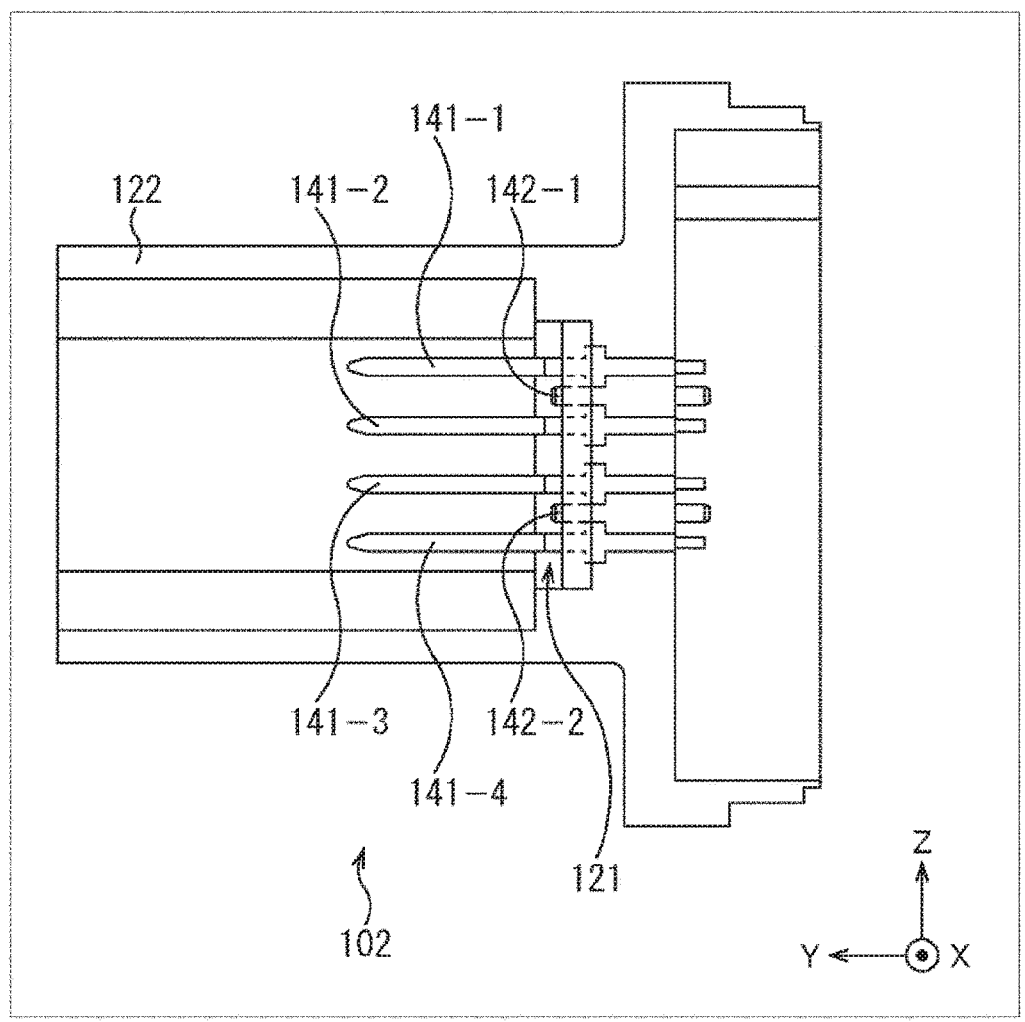
FIG. 8 is a cross-sectional view including a cross-sectional structure of an actual use contact disposed in the connector portion.

Additionally, FIG. 7 shows a cross-sectional view including cross-sections of the manufacturing contacts 142-1 and 142-2 disposed in the connector portion 121. Additionally, FIG. 8 shows a cross-sectional view including cross-sections of actual use contacts 141-1 to 141-4 disposed in the connector portion 121.

As shown in these cross-sectional views, the actual use contacts 141-1 to 141-4 and the manufacturing contacts 142-1 and 142-2 penetrate the connector portion 121 provided in the rear case 102. Moreover, in the connector portion 121, the length of the cores of the manufacturing contacts 142-1 and 142-2 is shorter than that of the actual use contacts 141-1 to 141-4 in a case of being viewed from the side (connection target side) of the vehicle connector provided on the vehicle side.

As described above, in the connector portion 121, two types of contacts, the actual use contact 141 used in actual use and the manufacturing contact 142 used only in manufacturing, are provided. The manufacturing contact 142 is not connected to the vehicle connector at the time of actual use, but is brought into contact with the jig connector connected to a device to be electrically connected at the time of manufacturing.

Accordingly, since the number of cores of the actual use contacts 141 in the connector portion 121 can be reduced to the necessary minimum number, it is possible to achieve reduction in manufacturing cost due to the reduction in the number of cores. Here, manufacturing cost can be reduced by the amount of price obtained by multiplying the price per core by the reduced number of cores, for example.

Additionally, the presence of unnecessary contacts at the time of actual use causes an increase in size. However, since the number of cores of the actual use contacts 141 can be reduced to the necessary minimum number by providing the manufacturing contacts 142 in the connector portion 121, downsizing of the connector itself can be achieved due to the reduction in the number of cores. For example, as described above, a connector used for an in-car camera is often required to be strictly restricted in size for convenience of routing in a vehicle. However, in the camera device 10 (FIG. 1), such a request can also be met by applying the connector portion 121 as the connector to be connected to the vehicle connector.

Figure 9:
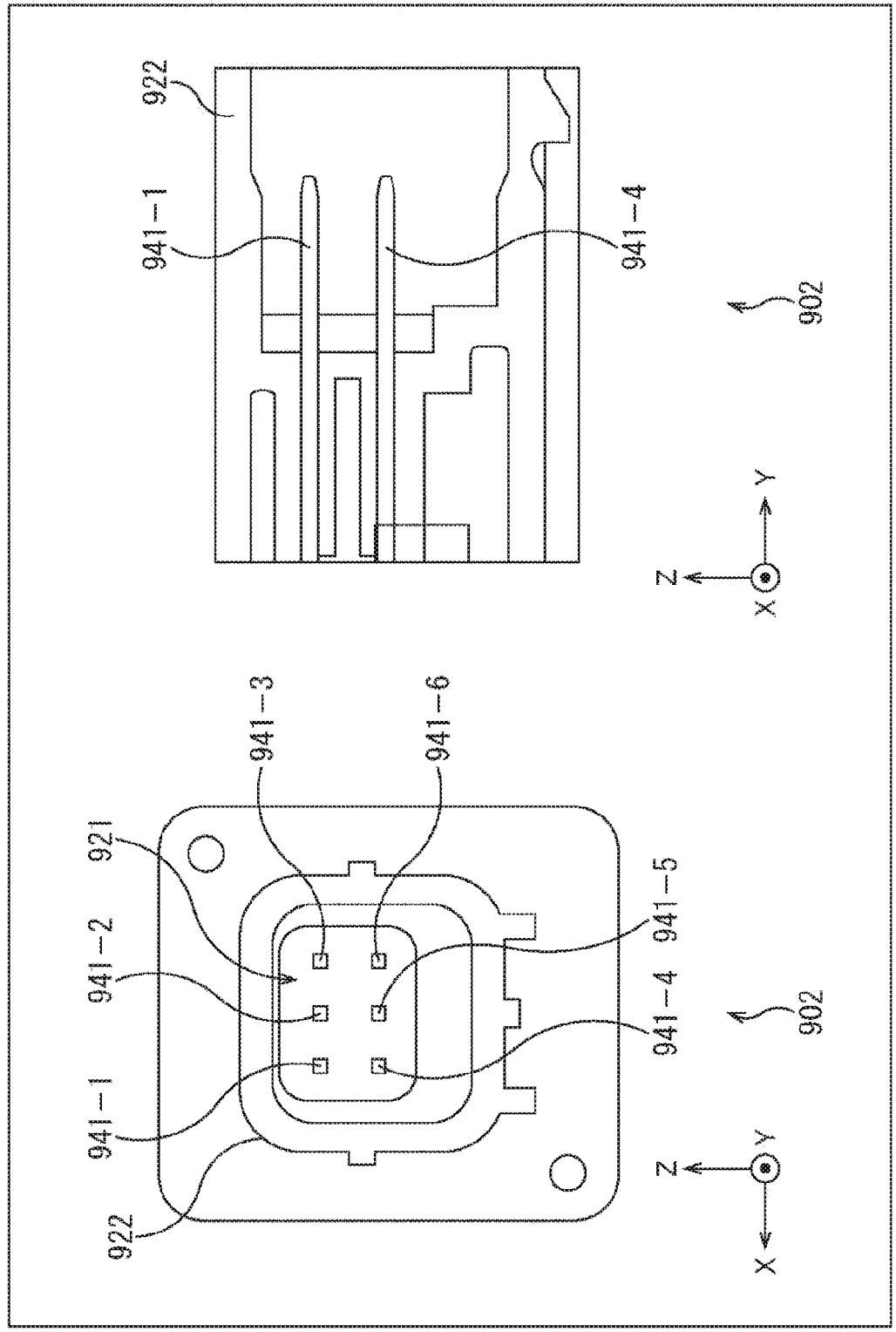
FIG. 9 is a diagram showing the structure of a connector portion of an existing rear case.

Here, for comparison, FIG. 9 shows the structure of a connector portion 921 provided in an existing rear case 902. In FIG. 9, a front view of the connector portion 921 is shown on the left side, and a cross-sectional view of the connector portion 921 is shown on the right side.

In FIG. 9, contacts 941-1 to 941-6 provided in the connector portion 921 in a square tube-shaped member 922 have the same core shape and the same core length. That is, in the connector portion 921, the contacts used only in manufacturing (in other words, contacts not used in actual use) have the same core shape and the same core length as the contacts used in actual use.

For example, among the contacts 941-1 to 941-6 provided in the connector portion 921, if the contact 941-4 and the contact 941-6 are used only in manufacturing, the contacts 941-4 and 941-6 used only in manufacturing have the same core shape and the same core length as the contacts 941-1, 941-2, 941-3, and 941-5 used in actual use.

As described above, the presence of unnecessary contacts 941-4 and 941-6 at the time of actual use in the connector portion 921 causes an increase in size in addition to an increase in manufacturing cost. Hence, in the technology according to the present disclosure (present technology), the connector portion 121 is provided with two types of contacts, the actual use contact 141 used in actual use and the manufacturing contact 142 used only in manufacturing, in the aim of reduction in manufacturing cost and downsizing.

For example, while the number of contacts required in actual use is determined according to the shape of the connector portion on the vehicle connector side, in the existing connector portion 921 described above, four of the six contacts are used at the time of actual use, but two are used only at the time of manufacturing and are considered unnecessary at the time of actual use. Here, while the four contacts used in actual use are used for the purpose of ground (GND), video signals, power supplies, or the like, for example, the two contacts used only in manufacturing are used for the purpose of communication or the like, for example. In such a case, if the present technology is applied, the number of contacts (number of cores) to be connected in actual use can be reduced from six to four, so that the cost can be reduced.

3. Structure of Connector Portion at Time of Connection (Structure of Connector Portion at Time of Actual Use)

Figure 10:
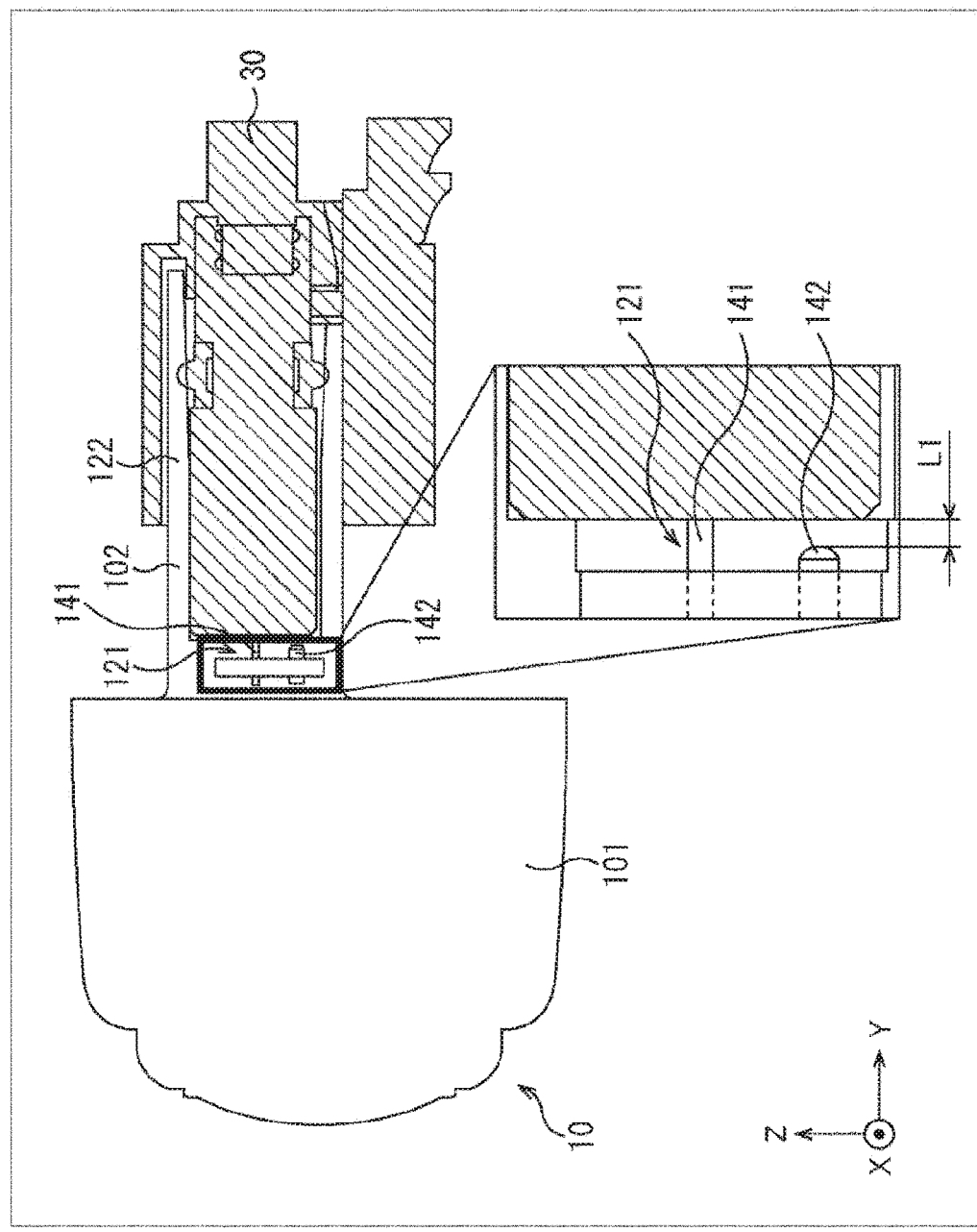
FIG. 10 is a cross-sectional view showing an example of the structure of the camera device and a vehicle connector at the time of actual use.

FIG. 10 is a cross-sectional view showing an example of the structure of the camera device 10 and the vehicle connector 30 at the time of actual use.

In FIG. 10, the vehicle connector 30 is inserted into and fitted to the square tube-shaped member 122 formed in the rear case 102 of the camera device 10. With this configuration, the connector portion 121 provided in the rear case 102 of the camera device 10 and (the connector portion of) the vehicle connector 30 provided in the vehicle are electrically connected.

Additionally, FIG. 10 shows an enlarged view of the vicinity of the connector portion 121 at the time of connection of the camera device 10 and the vehicle connector 30. As shown in the enlarged view, at the time of actual use, among the contacts provided in the connector portion 121, the actual use contact 141 is electrically connected to the vehicle connector 30, but the manufacturing contact 142 is not electrically connected to the vehicle connector 30.

At this time, as described above, the core length is adjusted such that the tip end of the core of the manufacturing contact 142 is separated from the tip end surface of the vehicle connector 30 by the length L1. That is, here, the connector portion 121 is designed such that the vehicle connector 30 does not interfere with the two manufacturing contacts 142-1 and 142-2 when the vehicle connector 30 is inserted into the square tube-shaped member 122.

Note that in the present technology, the shape and length of the cores of the manufacturing contacts 142-1 and 142-2 are different from those of the existing core. However, here, an existing core may be processed and diverted, for example, to reduce manufacturing cost even more.

(Structure of Actual Use Contact at Time of Actual Use)

Figure 11:
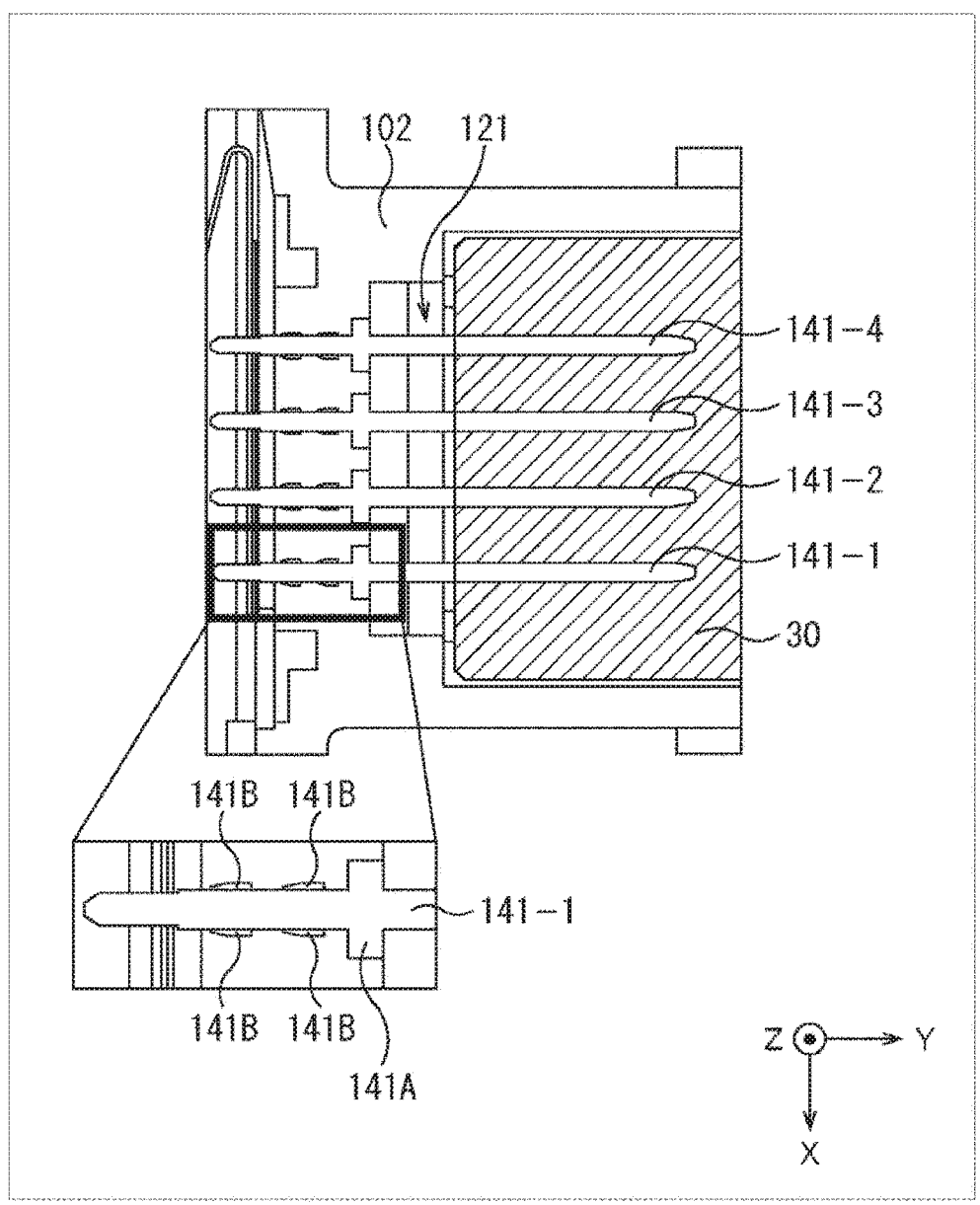
FIG. 11 is a cross-sectional view showing an example of the structure of the actual use contact at the time of actual use.

FIG. 11 is a cross-sectional view showing an example of the structure of the actual use contact 141 at the time of actual use.

FIG. 11 shows an enlarged view of the actual use contact 141-1 among the contacts included in the connector portion 121. As shown in the enlarged view, the actual use contact 141-1 has a stopper portion 141A and a barb portion 141B. The stopper portion 141A prevents the actual use contact 141-1 disposed in the connector portion 121 from slipping off. Additionally, the barb portions 141B formed in four places can prevent the actual use contact 141-1 disposed in the connector portion 121 from coming off the rear case 102.

Note that while some existing contacts have a stopper portion and a barb portion, in the present technology, a contact having such a stopper portion and a barb portion can be diverted as it is. Additionally, while the structure of the actual use contact 141-1 has been described as an example in the enlarged view of FIG. 11, the other actual use contacts 141-2 to 141-4 also have a similar structure. Moreover, while a case where the barb portions 141B are formed in four places (two places each on both sides) has been described as an example in the enlarged view of FIG. 11, the number and attachment position of the barb portions 141B are arbitrary.

(Structure of Connector Portion at Time of Manufacturing)

Note that although not shown, at the time of manufacturing, the jig connector to which the device used at the time of manufacturing is connected is inserted into the square tube-shaped member 122 formed on the rear case 102 of the camera device 10 With this configuration, the connector portion 121 provided in the rear case 102 of the camera device 10 and the jig connector are electrically connected.

For example, in the jig connector, terminals (cores) are disposed such that they come into contact with the manufacturing contacts 142-1 and 142-2 provided in the connector portion 121 when the jig connector is inserted into the square tube-shaped member 122. Accordingly, at the time of manufacturing, among the contacts provided in the connector portion 121, the manufacturing contact 142 is electrically connected to the jig connector. Hence, parameter information can be written to the camera device 10 by a device used at the time of manufacturing.

More specifically, in the jig connector, terminals (cores) may be disposed such that they correspond to the actual use contacts 141-1 to 141-4 and the manufacturing contacts 142-1 and 142-2 provided in the connector portion 121. Then, in the jig connector, the length of the terminal (core) can be varied according to the lengths of (cores of) the actual use contact 141 and the manufacturing contact 142, for example. Additionally, various shapes can be adopted as the shape of the core of the jig connector.

4. Modification (First Modification of Contact Layout)

Figure 12:
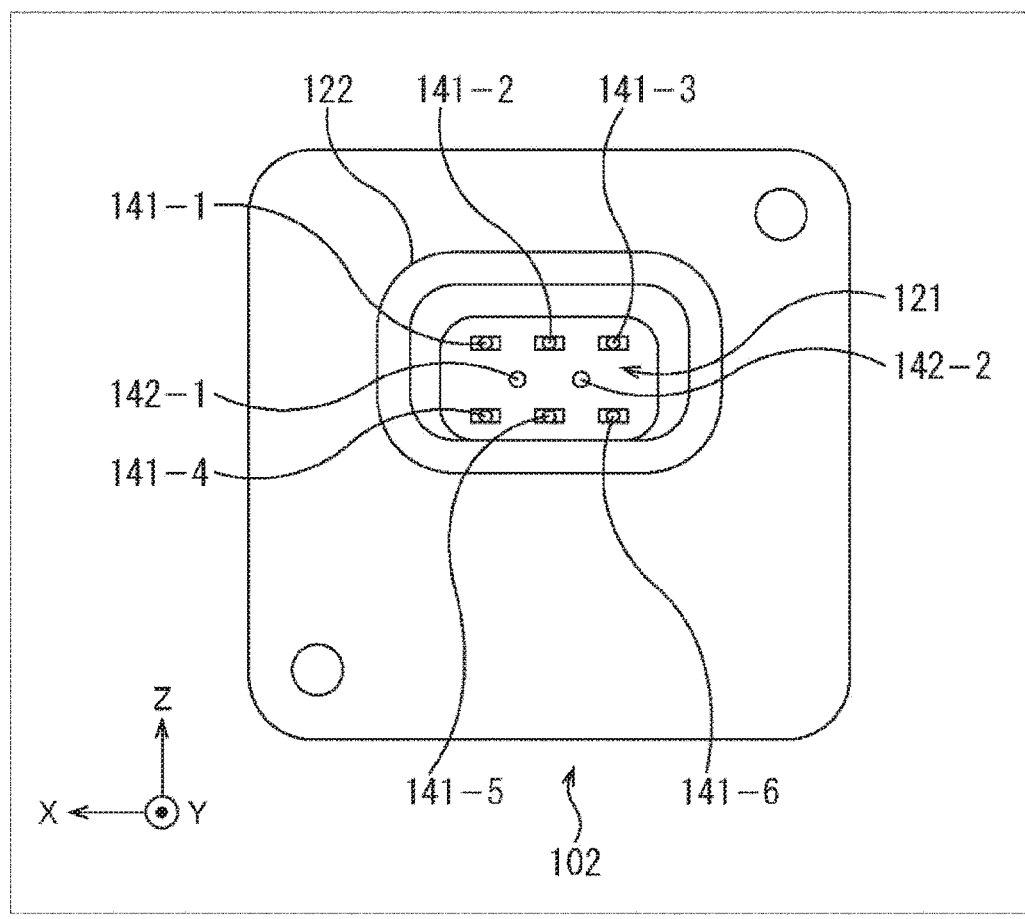
FIG. 12 is a diagram showing a first modification of the layout of the contacts in the connector portion.

FIG. 12 is a diagram showing a first modification of the layout of the contacts in the connector portion 121.

In a connector portion 121 of FIG. 12, manufacturing contacts 142-1 and 142-2 are provided at a predetermined interval in an area (middle area) excluding an upper area where actual use contacts 141-1 to 141-3 are provided and a lower area where actual use contacts 141-4 to 141-6 are provided.

That is, in a middle area of the connector portion 121 in the horizontal direction (X direction), the manufacturing contacts 142-1 and 142-2 are arranged next to each other at a predetermined interval in the horizontal direction, which is the same direction as the actual use contacts 141-1 to 141-3 arranged next to one another in the horizontal direction and the actual use contacts 141-4 to 141-6 arranged next to one another in the horizontal direction.

In the connector portion 121 of FIG. 12, the cores of the manufacturing contacts 142-1 and 142-2 are shorter than the cores of the actual use contacts 141-1 to 141-6, and are provided for writing parameter information at the time of manufacturing.

As described above, in the connector portion 121 of FIG. 12, the number of the actual use contacts 141 can be reduced by providing the manufacturing contacts 142 used only at the time of manufacturing. Hence, manufacturing cost can be reduced according to the reduced number of the actual use contacts 141.

Additionally, in the connector portion 121 of FIG. 12, since the manufacturing contact 142 is arranged in an area other than the area where the actual use contact 141 is arranged, there is no need to newly secure an area for placing the manufacturing contact 142. Additionally, the connector portion 121 can be downsized by making the manufacturing contact 142 a contact type. As a result, not only the manufacturing cost can be reduced, but also the connector itself can be downsized.

(Second Modification of Contact Layout)

Figure 13:
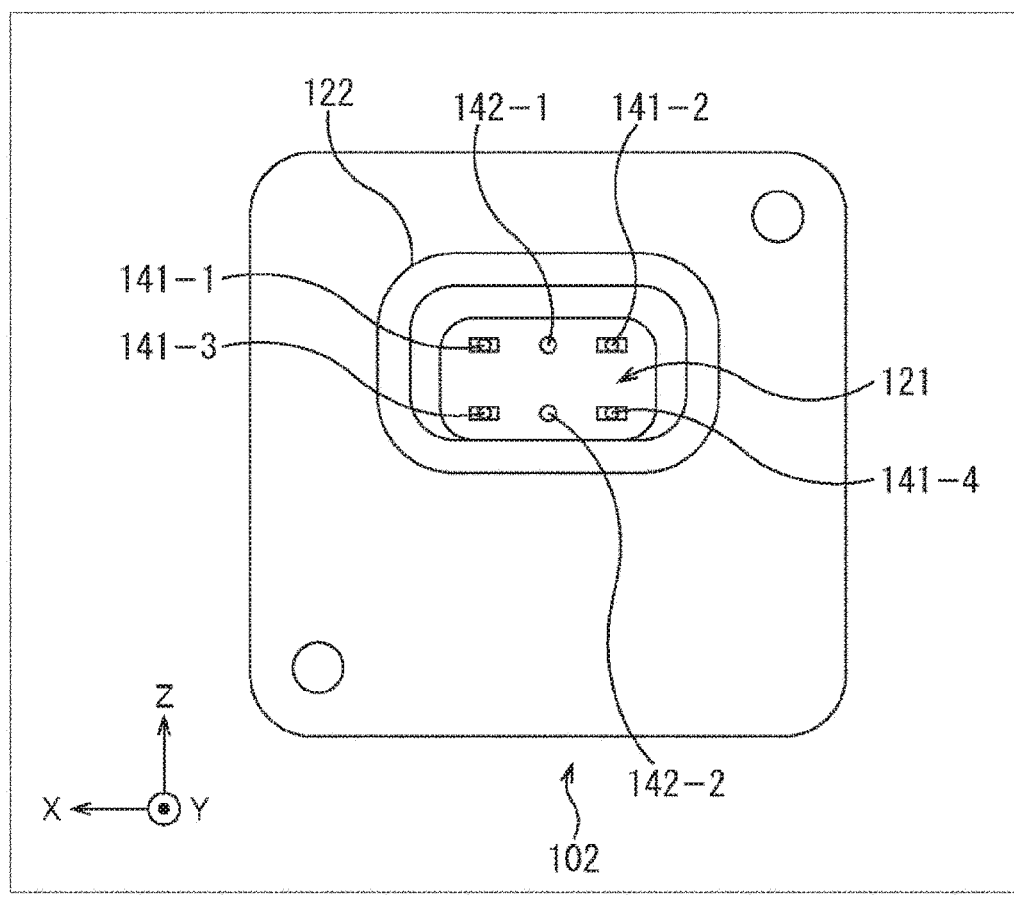
FIG. 13 is a diagram showing a second modification of the layout of the contacts in the connector portion.

FIG. 13 is a diagram showing a second modification of the layout of the contacts in a connector portion 121.

In the connector portion 121 of FIG. 13, manufacturing contacts 142-1 and 142-2 are provided at a predetermined interval in an area (middle area) excluding a left area where actual use contacts 141-1 and 141-3 are provided and a right area where actual use contacts 141-2 and 141-4 are provided.

That is, in a middle area of the connector portion 121 in the vertical direction (Y direction), the manufacturing contacts 142-1 and 142-2 are arranged next to each other at a predetermined interval in the vertical direction, which is the same direction as the actual use contacts 141-1 and 141-3 arranged next to each other in the vertical direction and the actual use contacts 141-2 and 141-4 arranged next to each other in the vertical direction.

As described above, in the connector portion 121 of FIG. 13, the number of the actual use contacts 141 can be reduced by providing the manufacturing contacts 142 used only at the time of manufacturing. Hence, manufacturing cost can be reduced according to the reduced number of the actual use contacts 141.

Additionally, in the connector portion 121 of FIG. 13, too, since the manufacturing contact 142 is arranged in an area other than the area where the actual use contact 141 is arranged, there is no need to newly secure an area for placing the manufacturing contact 142. Additionally, the connector portion 121 can be downsized by making the manufacturing contact 142 a contact type.

(Third Modification of Contact Layout)

Figure 14:
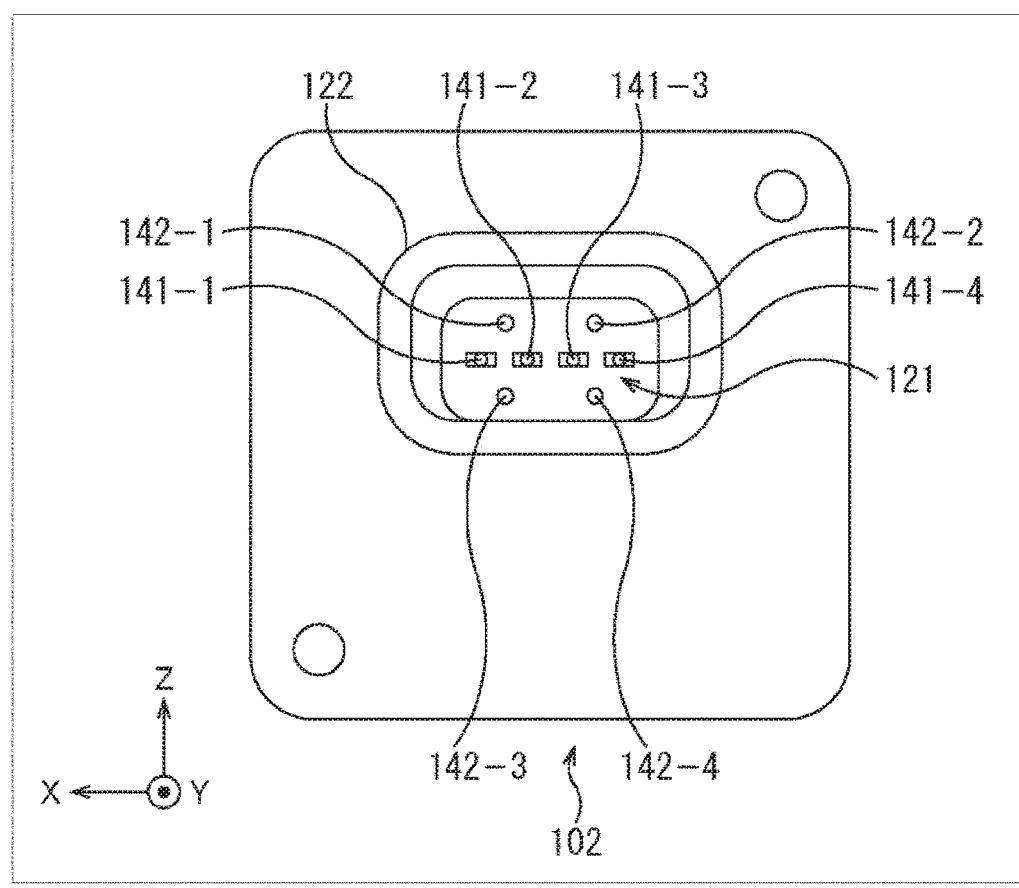
FIG. 14 is a diagram showing a third modification of the layout of the contacts in the connector portion.

FIG. 14 is a diagram showing a third modification of the layout of the contacts in a connector portion 121.

In the connector portion 121 of FIG. 14, manufacturing contacts 142-1 and 142-2 and manufacturing contacts 142-3 and 142-4 are provided at a predetermined interval in each of an upper area and a lower area, which are areas excluding a middle area where actual use contacts 141-1 to 141-4 are provided.

That is, in an upper area of the connector portion 121 in the horizontal direction (X direction), the manufacturing contacts 142-1 and 142-2 are arranged next to each other at a predetermined interval in the horizontal direction, which is the same direction as the actual use contacts 141-1 to 141-4 arranged next to one another in the horizontal direction. Additionally, in a lower area of the connector portion 121 in the horizontal direction (X direction), the manufacturing contacts 142-3 and 142-4 are arranged next to each other at a predetermined interval in the horizontal direction, which is the same direction as the actual use contacts 141-1 to 141-4 arranged next to one another in the horizontal direction.

As described above, in the connector portion 121 of FIG. 14, the number of the actual use contacts 141 can be reduced by providing the manufacturing contacts 142 used only at the time of manufacturing. Hence, manufacturing cost can be reduced according to the reduced number of the actual use contacts 141.

Additionally, in the connector portion 121 of FIG. 14, too, since the manufacturing contact 142 is arranged in an area other than the area where the actual use contact 141 is arranged, there is no need to newly secure an area for placing the manufacturing contact 142. Additionally, the connector portion 121 can be downsized by making the manufacturing contact 142 a contact type.

(Other Modification of Contact Layout)

Note that the layouts of the contacts shown in FIGS. 12 to 14 are an example, and as long as the manufacturing contact 142 is arranged in an area other than the area where the actual use contact 141 is arranged in the connector portion 121, other layout forms can be adopted such as arranging two manufacturing contacts 142 between two actual use contacts 141, for example.

In practice, the number and layout of the actual use contacts 141 are determined in accordance with the shape of the connector portion on the vehicle connector 30 side. Hence, in the connector portion 121, the manufacturing contacts 142 are arranged so as not to obstruct the actual use contacts 141, on the basis of the layout of the actual use contacts 141 arranged in accordance with the shape of the connector portion on the vehicle connector 30 side.

(Example of Connector Device)

The camera device 10 can be considered to be a connector device including the connector portion 121 provided in the rear case 102. Additionally, the camera device 10 is an example of a connector device including a connector portion 121 having two types of contacts, the actual use contact 141 used in actual use and the manufacturing contact 142 used only in manufacturing. Another electronic device (electronic device other than camera device 10) provided with the connector portion 121 can be a connector device to which the present technology is applied.

Additionally, the camera device 10 as a first connector device and the vehicle connector 30 (second connector device) connected to the connector portion 121 of the camera device 10 can also be regarded as being included in a connector system. Here, the system refers to a system in which multiple devices are logically gathered.

5. Example of Application to Mobile Object

The technology according to the present disclosure (present technology) can be applied to various products. For example, the technology according to the present disclosure can be implemented as a device mounted on any of types of mobile objects such as an automobile, an electric vehicle, a hybrid electric vehicle, a motorcycle, a bicycle, personal mobility, an airplane, a drone, a ship, and a robot.

Figure 15:
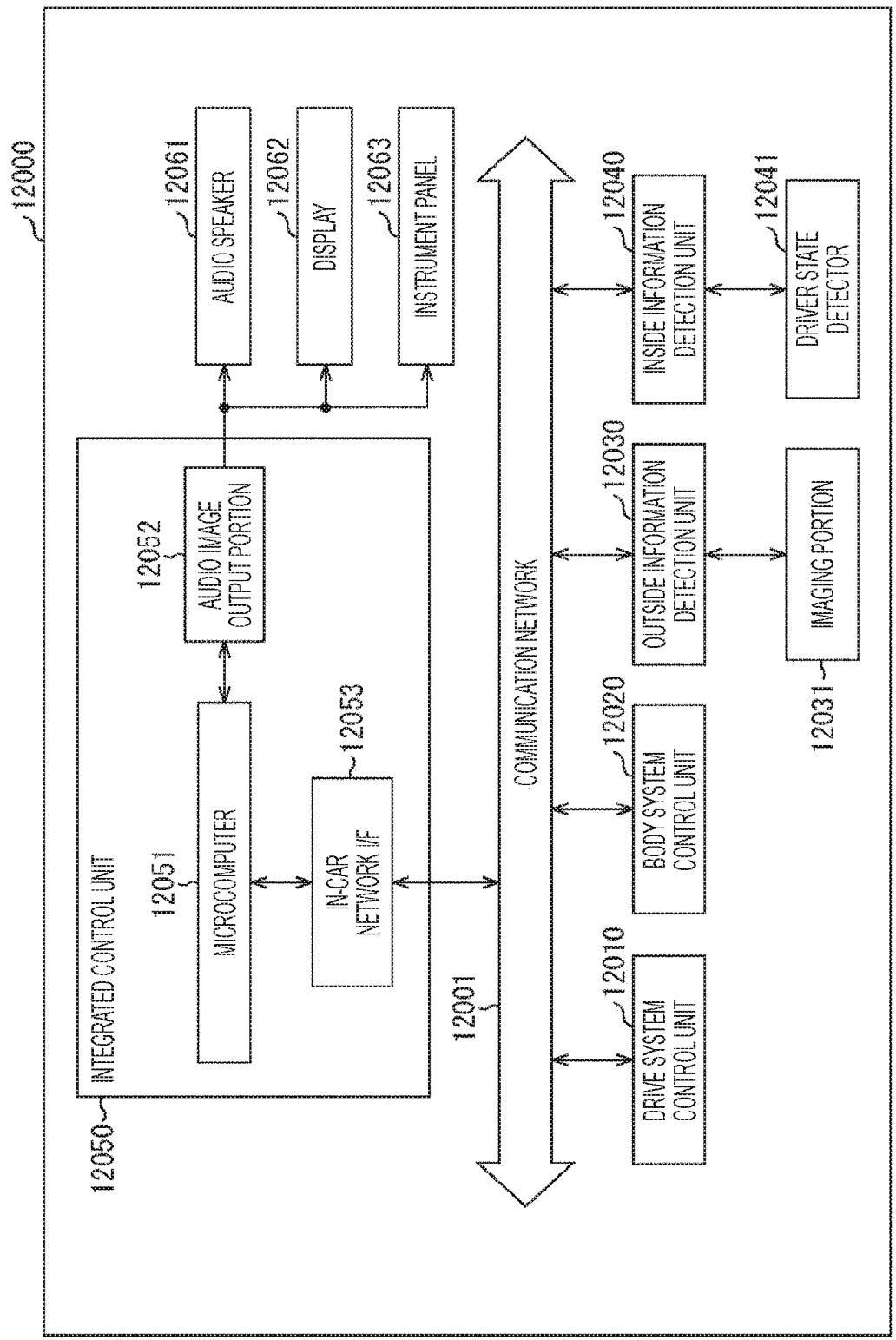
FIG. 15 is a block diagram showing an example of a schematic configuration of a vehicle control system.

FIG. 15 is a block diagram showing a schematic configuration example of a vehicle control system which is an example of a mobile control system to which the technology according to the present disclosure can be applied.

A vehicle control system 12000 includes multiple electronic control units connected through a communication network 12001. In the example shown in FIG. 15, the vehicle control system 12000 includes a drive system control unit 12010, a body system control unit 12020, an outside information detection unit 12030, an inside information detection unit 12040, and an integrated control unit 12050. Additionally, as a functional configuration of the integrated control unit 12050, a microcomputer 12051, an audio image output portion 12052, and an in-car network interface (I/F) 12053 are illustrated.

The drive system control unit 12010 controls the operation of devices related to the drive system of the vehicle according to various programs. For example, the drive system control unit 12010 functions as a drive force generation device for generating a drive force of a vehicle such as an internal combustion engine or a drive motor, a drive force transmission mechanism for transmitting the drive force to wheels, a steering mechanism that adjusts the steering angle of the vehicle, and a controller such as a braking device that generates a braking force of the vehicle.

The body system control unit 12020 controls the operation of various devices equipped on the vehicle body according to various programs. For example, the body system control unit 12020 functions as a controller of a keyless entry system, a smart key system, a power window device, or a controller of various lamps such as a headlamp, a back lamp, a brake lamp, a blinker, or a fog lamp. In this case, the body system control unit 12020 may receive input of radio waves transmitted from a portable device substituting a key or signals of various switches. The body system control unit 12020 receives input of these radio waves or signals, and controls a door lock device, a power window device, a lamp and the like of the vehicle.

The outside information detection unit 12030 detects information outside the vehicle equipped with the vehicle control system 12000. For example, an imaging portion 12031 is connected to the outside information detection unit 12030. The outside information detection unit 12030 causes the imaging portion 12031 to capture an image of the outside of the vehicle, and receives the captured image. The outside information detection unit 12030 may perform object detection processing or distance detection processing of a person, a vehicle, an obstacle, a sign, characters on a road surface, or the like on the basis of the received image.

The imaging portion 12031 is an optical sensor that receives light and outputs an electrical signal corresponding to the amount of light received. The imaging portion 12031 can output an electric signal as an image or can output the electrical signal as distance measurement information. Additionally, the light received by the imaging portion 12031 may be visible light or non-visible light such as infrared light.

The inside information detection unit 12040 detects information inside the vehicle. For example, a driver state detector 12041 that detects a state of a driver is connected to the inside information detection unit 12040. The driver state detector 12041 includes a camera for capturing an image of the driver, for example, and the inside information detection unit 12040 may calculate the degree of fatigue or concentration of the driver or determine whether the driver is asleep, on the basis of the detection information input from the driver state detector 12041.

The microcomputer 12051 can calculate a control target value of the drive force generation device, the steering mechanism or the braking device on the basis of the information outside or inside the vehicle acquired by the outside information detection unit 12030 or the inside information detection unit 12040, and output a control command to the drive system control unit 12010. For example, the microcomputer 12051 can perform coordinated control aimed to achieve functions of an advanced driver assistance system (ADAS) including collision avoidance or shock mitigation of a vehicle, follow-up traveling based on an inter-vehicle distance, vehicle speed maintenance traveling, vehicle collision warning, vehicle lane departure warning, or the like.

Additionally, the microcomputer 12051 can control the drive force generation device, the steering mechanism, the braking device, or the like on the basis of the information around the vehicle acquired by the outside information detection unit 12030 or the inside information detection unit 12040, to perform coordinated control aimed for automatic driving of traveling autonomously without depending on the driver's operation, for example.

Additionally, the microcomputer 12051 can output a control command to the body system control unit 12020 on the basis of the information outside the vehicle acquired by the outside information detection unit 12030. For example, the microcomputer 12051 can control the headlamp according to the position of the preceding vehicle or oncoming vehicle detected by the outside information detection unit 12030, and perform cooperative control aimed for glare prevention such as switching from high beam to low beam.

The audio image output portion 12052 transmits an output signal of at least one of audio or image to an output device capable of visually or aurally notifying information to a passenger of the vehicle or to the outside of the vehicle. In the example of FIG. 15, an audio speaker 12061, a display 12062, and an instrument panel 12063 are illustrated as examples of the output device. The display 12062 may include at least one of an onboard display or a head-up display, for example.

Figure 16:
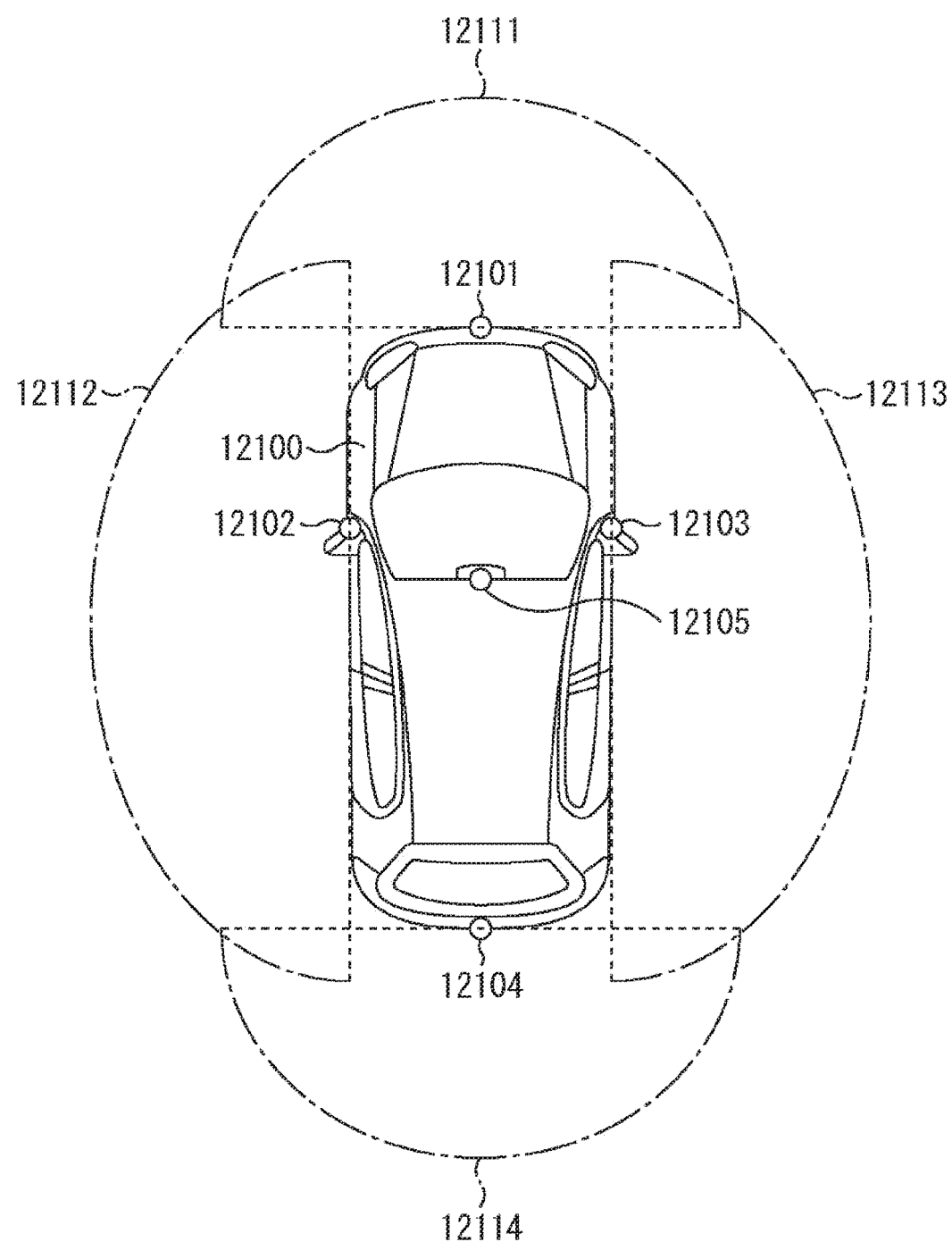
FIG. 16 is an explanatory view showing an example of installation positions of an outside information detector and an imaging portion.

FIG. 16 is a diagram showing an example of the installation position of the imaging portion 12031.

In FIG. 16, a vehicle 12100 includes imaging portions 12101, 12102, 12103, 12104, and 12105 as the imaging portion 12031.

The imaging portions 12101, 12102, 12103, 12104, and 12105 are provided in positions such as a front nose, a side mirror, a rear bumper, a back door, and an upper portion of a windshield in the vehicle interior of the vehicle 12100, for example. The imaging portion 12101 provided in the front nose and the imaging portion 12105 provided in the upper part of the windshield in the vehicle interior mainly acquire an image of the front of the vehicle 12100. The imaging portions 12102 and 12103 provided in the side mirrors mainly acquire images of the sides of the vehicle 12100. The imaging portion 12104 provided in the rear bumper or the back door mainly acquires an image of the rear of the vehicle 12100. Images of the front acquired by the imaging portions 12101 and 12105 are mainly used to detect a preceding vehicle or a pedestrian, an obstacle, a traffic light, a traffic sign, a lane, or the like.

Note that FIG. 16 shows an example of the imaging range of the imaging portions 12101 to 12104. An imaging range 12111 indicates the imaging range of the imaging portion 12101 provided in the front nose, imaging ranges 12112 and 12113 indicate the imaging ranges of the imaging portions 12102 and 12103 provided on the side mirrors, respectively, and an imaging range 12114 indicates the imaging range of the imaging portion 12104 provided in the rear bumper or the back door. For example, by superimposing the pieces of image data captured by the imaging portions 12101 to 12104, a bird's eye view image of the vehicle 12100 as viewed from above can be obtained.

At least one of the imaging portions 12101 to 12104 may have a function of acquiring distance information. For example, at least one of the imaging portions 12101 to 12104 may be a stereo camera including multiple imaging devices, or may be an imaging device having pixels for phase difference detection.

For example, the microcomputer 12051 can measure the distance to each three-dimensional object in the imaging ranges 12111 to 12114 and the temporal change of this distance (relative velocity with respect to vehicle 12100) on the basis of the distance information obtained from the imaging portions 12101 to 12104, to extract, as a preceding vehicle, the closest three-dimensional object on the traveling path of the vehicle 12100 in particular, among three-dimensional objects traveling at a predetermined speed (e.g., 0 km/h or more) in substantially the same direction as the vehicle 12100. Moreover, the microcomputer 12051 can set an inter-vehicle distance to be secured in advance before the preceding vehicle, and perform automatic brake control (including follow-up stop control), automatic acceleration control (including follow-up start control), and the like. As described above, it is possible to perform coordinated control aimed for automatic driving of traveling autonomously without depending on the driver's operation, for example.

For example, on the basis of the distance information obtained from the imaging portions 12101 to 12104, the microcomputer 12051 can extract three-dimensional object data regarding three-dimensional objects by classifying the data into three-dimensional objects such as two-wheeled vehicle, ordinary vehicle, large vehicle, pedestrian, telephone pole, and other three-dimensional object, and use the data for automatic avoidance of obstacles. For example, the microcomputer 12051 identifies obstacles around the vehicle 12100 into obstacles visible and obstacles hardly visible to the driver of the vehicle 12100. Then, the microcomputer 12051 can determine the collision risk indicating the degree of risk of collision with each obstacle, and when the collision risk is a setting value or more and there is a possibility of a collision, can perform driving support for collision avoidance by outputting a warning to the driver through the audio speaker 12061 or the display 12062, or by performing forcible deceleration or avoidance steering through the drive system control unit 12010.

At least one of the imaging portions 12101 to 12104 may be an infrared camera that detects infrared light. For example, the microcomputer 12051 can recognize a pedestrian by determining whether or not a pedestrian is present in the images captured by the imaging portions 12101 to 12104. Such pedestrian recognition is performed by a procedure of extracting feature points in images captured by the imaging portions 12101 to 12104 as infrared cameras, and a procedure of performing pattern matching processing on a series of feature points indicating the outline of an object to determine whether or not the object is a pedestrian, for example. If the microcomputer 12051 determines that a pedestrian is present in the images captured by the imaging portions 12101 to 12104 and recognizes the pedestrian, the audio image output portion 12052 controls the display 12062 to superimpose a square outline for emphasis on the recognized pedestrian. Additionally, the audio image output portion 12052 may control the display 12062 to display an icon or the like indicating a pedestrian in a desired position.

The example of the vehicle control system to which the technology according to the present disclosure can be applied has been described above. The technology according to the present disclosure is applicable to the imaging portion 12031 among the configurations described above. Specifically, the camera device 10 is applicable to the imaging portions 12101, 12102, 12103, 12104, and 12105 as the imaging portion 12031. That is, the imaging portion 12101 in FIG. 16 corresponds to the aforementioned front view camera, the imaging portions 12102 and 12103 in FIG. 16 correspond to the aforementioned side view camera, the imaging portion 12104 in FIG. 16 corresponds to the aforementioned rear view camera, and the parts are connected to a vehicle connector provided in the vehicle 12100. By applying the technology according to the present disclosure to the imaging portion 12031, it is possible to downsize the connection portion with the vehicle connector even more.

Note that the embodiments of the present technology are not limited to the above-described embodiments, and various modifications can be made without departing from the scope of the present technology.

Additionally, the present technology can have the following configurations.

(1)

A connector device including a first contact used in actual use, and a second contact used only in manufacturing, in which the first contact and the second contact have different core lengths in a case of being viewed from a connection target side.

(2)

The connector device according to (1), in which a core of the first contact is longer than a core of the second contact.

(3)

The connector device according to any one of (1) and (2), in which the first contact and the second contact have same or different shapes.

(4)

The connector device according to any one of (1) to (3), in which at a time of actual use, the first contact is electrically connected to a connection target connector, and the second contact is not electrically connected to the connection target connector.

(5)

The connector device according to any one of (1) to (4), in which at a time of manufacturing, the second contact is electrically connected to a device used at the time of manufacturing through a connection target connector that is configured to be electrically connectable to the second contact.

(6)

The connector device according to (5), in which the second contact is electrically connected by coming into contact with a connection target connector.

(7)

The connector device according to any one of (1) to (6), in which one or a plurality of the first contacts and one or a plurality of the second contacts are provided in a connector portion including a predetermined area in a case of being viewed from a connection target side, and the one or plurality of second contacts is provided in an area excluding an area where the one or plurality of first contacts is provided in the predetermined area.

(8)

The connector device according to (7), in which a plurality of the second contacts is provided next to one another in the horizontal direction or the vertical direction with respect to a plurality of the first contacts provided next to one another in the horizontal direction or the vertical direction in a case of being viewed from a connection target side.

(9)

The connector device according to (7), in which a plurality of the second contacts are disposed between two of the first contacts among a plurality of the first contacts provided next to one another in the horizontal direction or the vertical direction in a case of being viewed from the connection target side.

(10)

The connector device according to any one of (1) to (9) further including a camera device having an imaging function, in which the camera device is electrically connected to a vehicle connector provided in a vehicle.

(11)

A connector system including a first connector device and a second connector device, in which:

the first connector device includes a first contact used in actual use, and a second contact used only in manufacturing;

the first contact and the second contact have different core lengths in a case of being viewed from a connection target side; and the second connector device includes a connection portion corresponding to the first contact.

REFERENCE SIGNS LIST 10, 20 Camera device
30 Vehicle connector
100 Housing
101 Front case
102 Rear case
103 O-ring
104 Lens barrel
105 Sheet
106 Imaging mechanism
107 Shield chassis
108 Spacer
121 Connector portion
122 Member
141, 141-1 to 141-4 Actual use contact
142, 142-1 to 142-2 Manufacturing contact

The invention claimed is:

1. A connector device, comprising:
a first contact used in actual use, of a first device associated with the connector device, subsequent to a manufacturing process of the first device, and
a second contact configured to:
connect to a second device only in the manufacturing process,
disconnect from the second device upon completion of the manufacturing process, and
remain in a disconnected state subsequent to the disconnection, from the second device, upon the completion of the manufacturing process,
wherein:
the second device is different from the first device, and
the first contact and the second contact have different core lengths in a case of being viewed from a connection target side.

2. The connector device according to claim 1, wherein a core length of the first contact is longer than a core length of the second contact.

3. The connector device according to claim 2, wherein the first contact and the second contact have different shapes.

4. The connector device according to claim 3, wherein
at a time of the actual use of the first device,
the first contact is electrically connected to a connection target connector, and
the second contact is not electrically connected to the connection target connector.

5. The connector device according to claim 3, wherein
at a time of the manufacturing process of the first device,
the second contact is electrically connected to the second device, used at the time of the manufacturing process of the first device, through a connection target connector configured to electrically connect to the second contact.

6. The connector device according to claim 5, wherein the second contact is electrically connected to the second device via the electrical connection with the connection target connector.

7. The connector device according to claim 1, wherein
at least one first contact of a plurality of the first contacts and at least one second contact of a plurality of the second contacts are provided in a connector portion including a predetermined area in the case of being viewed from the connection target side,
the at least one second contact is provided in a first area excluding a second area, and
the at least one first contact of the plurality first contacts is provided in the second area of the predetermined area.

8. The connector device according to claim 7, wherein the plurality of second contacts are provided next to one another in one of a horizontal direction or a vertical direction with respect to the plurality of first contacts provided next to one another in at least one of the horizontal direction or the vertical direction in the case of being viewed from the connection target side.

9. The connector device according to claim 7,
wherein,
the at least one second contact of the plurality of second contacts is disposed between two first contacts of the plurality of first contacts, and
the two first contacts are provided next to one another in a horizontal direction or a vertical direction in the case of being viewed from the connection target side.

10. The connector device according to claim 1,
wherein
the first device corresponds to a camera device having an imaging function, and
the camera device is electrically connected to a vehicle connector provided in a vehicle.

11. A connector system, comprising:
a first connector device; and
a second connector device,
wherein:
the first connector device includes:
a first contact used in actual use, of a first device associated with the first connector device, subsequent to a manufacturing process of the first device, and
a second contact configured to:
connect to a second device only in the manufacturing process,
disconnect from the second device upon completion of the manufacturing process, and
remain in a disconnected state subsequent to the disconnection, from the second device, upon the completion of the manufacturing process, wherein
the second device is different from the first device, and
the first contact and the second contact have different core lengths in a case of being viewed from a connection target, and
the second connector device includes a connection portion corresponding to the first contact.

12. An imaging apparatus, comprising:
an imaging device; and
a connector device,
wherein the connector device comprises:
a first contact used in actual use, of a first device associated with the connector device, subsequent to a manufacturing process of the first device, and
a second contact configured to:
connect to a second device only in the manufacturing process,
disconnect from the second device upon completion of the manufacturing process, and
remain in a disconnected state subsequent to the disconnection, from the second device, upon the completion of the manufacturing process, wherein,
the second device is different from the first device, and
the first contact and the second contact have different core lengths in a case of being viewed from a connection target side.

13. The imaging apparatus according to claim 12, wherein a core length of the first contact is longer than a core length of the second contact.

14. The imaging apparatus according to claim 13, wherein the first contact and the second contact have different shapes.

15. The imaging apparatus according to claim 14, wherein
at a time of the actual use of the first device,
the first contact is electrically connected to a connection target connector, and
the second contact is not electrically connected to the connection target connector.

16. The imaging apparatus according to claim 14, wherein
at a time of the manufacturing process of the first device,
the second contact is electrically connected to the second device, used at the time of the manufacturing process of the first device, through a connection target connector configured to electrically connect to the second contact.

17. The imaging apparatus according to claim 16, wherein the second contact is electrically connected to the second device via the electrical connection with the connection target connector.

18. The imaging apparatus according to claim 12, wherein
at least one first contact of a plurality of the first contacts and at least one second contact of a plurality of the second contacts are provided in a connector portion including a predetermined area in the case of being viewed from the connection target side,
the at least one second contact is provided in a first area excluding a second area, and
the at least one first contact of the plurality first contacts is provided in the second area of the predetermined area.

19. The imaging apparatus according to claim 18, wherein the plurality of second contacts are provided next to one another in one of a horizontal direction or a vertical direction with respect to the plurality of first contacts provided next to one another in at least one of the horizontal direction or the vertical direction in the case of being viewed from the connection target side.

20. The imaging apparatus according to claim 18, wherein,
   the at least one second contact of the plurality of second contacts is disposed between two first contacts of the plurality of first contacts, and
   the two first contacts are provided next to one another in a horizontal direction or a vertical direction in the case of being viewed from the connection target side.

21. The imaging apparatus according to claim 18, wherein
   the first device corresponds to a camera device having an imaging function, and
   the camera device is electrically connected to a vehicle connector provided in a vehicle.

\* \* \* \* \*